(12) United States Patent
Yokogawa et al.

(10) Patent No.: US 7,460,792 B2
(45) Date of Patent: *Dec. 2, 2008

(54) RECEIVING CIRCUIT AND ELECTRONIC APPARATUS FOR OPTICAL COMMUNICATION

(75) Inventors: Naruichi Yokogawa, Kashihara (JP); Takeshi Nishino, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 391 days.

This patent is subject to a terminal disclaimer.

(21) Appl. No.: 11/175,340

(22) Filed: Jul. 7, 2005

(65) Prior Publication Data

US 2006/0008280 A1 Jan. 12, 2006

(30) Foreign Application Priority Data

Jul. 9, 2004 (JP) .............................. 2004-203959

(51) Int. Cl.
*H04B 10/06* (2006.01)

(52) U.S. Cl. ...................... 398/202; 398/208; 398/209; 398/210; 398/211; 398/214; 398/17; 398/24; 398/25; 398/26; 398/27; 398/135; 398/136; 398/158; 398/159; 398/161; 250/214 A; 250/214 LA; 250/214 AG; 250/214 R; 250/338.1; 330/59; 330/308; 327/100; 375/317; 375/318

(58) Field of Classification Search ................ 398/202, 398/208, 209, 210, 211, 214, 135, 136, 137, 398/138, 139, 141, 158, 159, 161, 128, 17, 398/24, 25, 26, 27; 250/214 A, 214 R, 214 AG, 250/214 LA, 338.1; 330/59, 308, 253, 306; 375/317, 318, 22, 26, 35, 37; 327/100, 557

See application file for complete search history.

(56) References Cited

U.S. PATENT DOCUMENTS 4,497,068 A * 1/1985 Fischer ...................... 398/192
5,469,287 A * 11/1995 Iwakuni ...................... 398/202
6,556,330 B2 * 4/2003 Holcombe .................. 398/202
2002/0167706 A1 * 11/2002 Adamietz et al. ........... 359/189
2005/0087688 A1 * 4/2005 Yokogawa et al. ......... 250/338.1

FOREIGN PATENT DOCUMENTS

JP 05-175818 7/1993
JP 2000-115078 A 4/2000

* cited by examiner

*Primary Examiner*—Hanh Phan
(74) *Attorney, Agent, or Firm*—Birch, Stewart, Kolasch & Birch, LLP (57) ABSTRACT

In an optical communication-use receiving circuit of the present invention, the pulse width of the received pulse which is a binary signal corresponding to the signal optical pulse is specified by using an integration circuit and a trigger generating circuit. If the pulse width of the received pulse is not shorter than a predetermined value, a signal having a fixed pulse width is outputted as an output signal from a one-shot pulse generating circuit, so that a pulse having a constant pulse width corresponding to the specified communication speed is outputted. Accordingly, if the pulse width deriving from the signal optical pulse is larger than a certain value, the communication is deemed as a low-speed communication, and a pulse having a constant pulse width corresponding to the communication speed is outputted. As a result, it is possible to realize a small-size receiving circuit and a small-size electronic device which require no external switching-over terminal.

11 Claims, 7 Drawing Sheets

CONVENTIONAL ART

RECEIVING CIRCUIT AND ELECTRONIC APPARATUS FOR OPTICAL COMMUNICATION

This Nonprovisional application claims priority under 35 U.S.C. § 119(a) on Patent Application No. 2004/203959 filed in Japan on Jul. 9, 2004, the entire contents of which hereby incorporated by reference.

FIELD OF THE INVENTION

The present invention relates to a receiving circuit an electronic apparatus for use in an optical communication using light such as an infrared ray.

BACKGROUND OF THE INVENTION

A size of a transmitting/receiving module for use in infrared data communication has been reduced. Further, performance of such a transmitting/receiving module has been improved, and its processing speed has been accelerated. In regard to the acceleration of the processing speed, it is necessary that the transmitting/receiving module be capable of handling a conventional low-speed communication as well as a high-speed communication, so that the transmitting/receiving module is compatible, in terms of communication, with a conventional low-speed devices. In short, it is necessary that the transmitting/receiving module support the low-speed communications as well as the high-speed communications. The most important problem to be solved for achieving this is performance of a receiving device. In the receiving device, a pulse needs to be reproduced based on a communication speed, and this pulse is transmitted to a controller LSI in a latter stage. This receiving device needs to support various communication speeds.

An example of the prior art is disclosed in Japanese Unexamined Patent Application No. 2000-115078 (Tokukai 2000-115078; published on Apr. 21, 2000).

Figure 9:
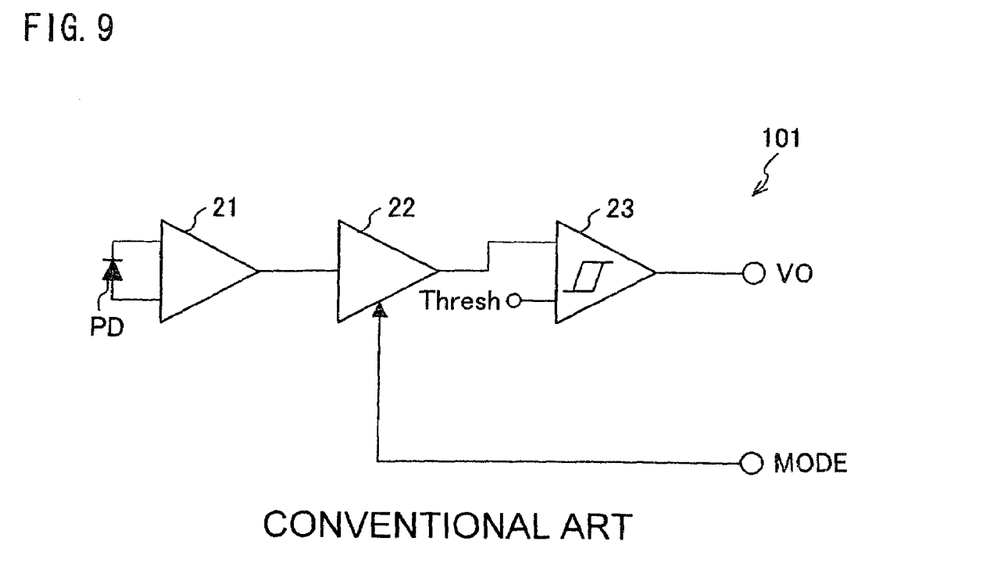
FIG. 9 is a block diagram illustrating an exemplary configuration of a conventional receiving circuit for use in an infrared data communication.
Figure 10:
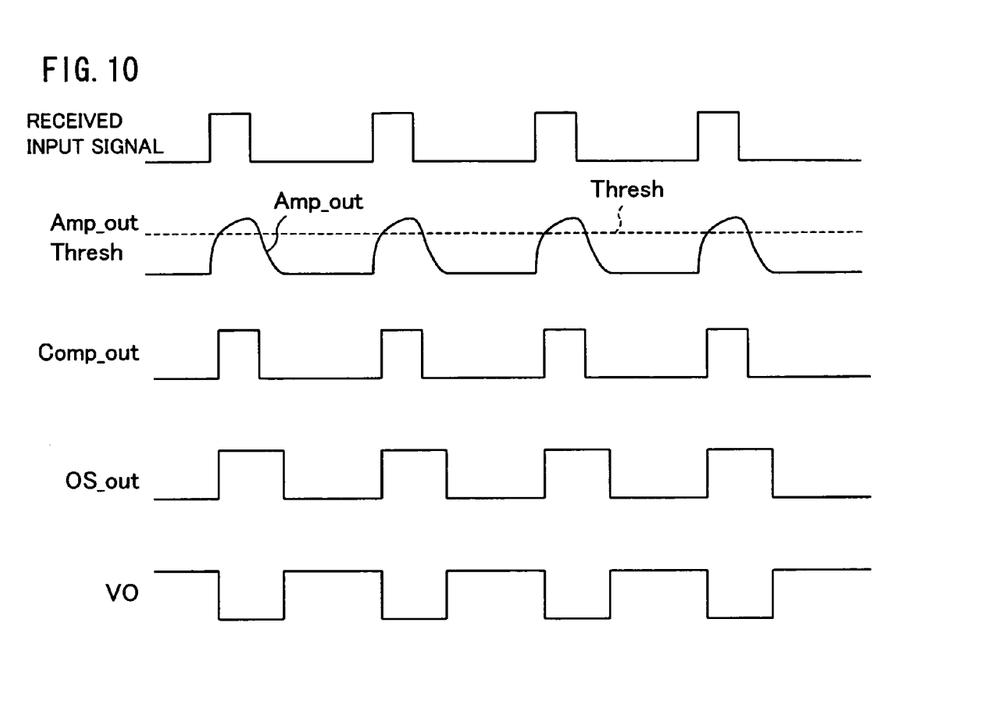
FIG. 10 is a diagram illustrating exemplary waveforms in the conventional receiving circuit for use in an infrared data communication.

FIG. 9 is a block diagram illustrating a conventional receiving system for use in a infrared data communication. In a typical arrangement of a receiving circuit 101 for use in an optical communication, a photocurrent signal (optical signal pulse) is inputted via a photodiode chip (PD), and is amplified in amplifying circuits 21 and 22 in an integrated receiving chip. Then, in a hysteresis comparator 23, a pulse-reshaping process is carried out with respect to the amplified photocurrent signal by comparing the amplified photocurrent signal with a threshold "Thresh" for use in measuring a signal, so as to convert the amplified photocurrent signal into a digital signal (received pulse). Then, the digital signal is outputted in the form of pulse to a received output (VO). The received output (VO) is connected to the controller LSI (not shown), and the digital signal outputted from the received output is processed in the control LSI. In order to accelerate the communication speed, frequency bands of the amplifying circuits 21 and 22 are increased so as to correspond to the high speed communication. Alternatively, performance of the pulse generating circuit (hysteresis comparator circuit 23) is improved. However, for example, the following problems occur when increasing the frequency bands or accelerating the performance of the pulse generating circuit. Namely, an internal noise level is increased in the receiving device on account of an increase in the frequency bands. Further, an increase of unwanted noise or the like problem takes place on account of an acceleration in the processing speed of the pulse generating circuit.

In view of the foregoing problems of noise, a common infrared data communication standard known as IrDA defines standards of reception sensitivity which are different from one another on a transmission speed basis. In a low-speed communication of 2.4 kbps to 115.2 kbps, the sensitivity of the receiving device is defined as 4 $\mu W/cm^2$. In a high-speed communication of over 115.2 kbps (e.g. 576 kbps, 1.152 Mbps, 4 Mbps, and 16 Mbps), the sensitivity is defined as 10 $\mu W/cm^2$. That is, the sensitivity is so defined that the sensitivity in the high-speed communication is 2.5 times of the sensitivity in the low-speed communication.

Conventionally, the receiving device has been so arranged that properties of the receiving circuit are switched over depending on the communication speeds. In the case of FIG. 9, a terminal (MODE) is the terminal for switching the properties.

However, due to the trend of reducing a size of an apparatus having an infrared transmitting/receiving module device, a size of the device needs to be even smaller, and the number of terminals in the device needs to be reduced. This calls for a measure which eliminates a need of switching-over terminals.

SUMMARY OF THE INVENTION

In view of the foregoing problems, the present invention is made, and it is an object of the present invention to provide a receiving circuit and an electronic apparatus for use in an infrared data communication, whose respective sizes can be reduced, the receiving circuit and the electronic apparatus which need no external switching over terminal.

In order to achieve the foregoing object, a receiving circuit of the present invention is a receiving circuit, for use in an optical communication, from which an output signal is outputted in accordance with a signal optical pulse incident to a light-receiving element, the receiving circuit including: a variable output circuit for (I) detecting a pulse width of the signal optical pulse, (II) determining a pulse width of the output signal in accordance with the pulse width of the signal optical pulse, and (III) outputting the output signal.

In the configuration, the pulse width of the signal optical pulse is measured, and the output signal whose pulse width is determined in accordance with the pulse width of the signal optical pulse is outputted. This allows outputting of an output signal based on the signal optical pulse in the receiving circuit. Further, it is not necessary to separately provide an external terminal for instructing switching over. Therefore, a space for the external terminal is no longer necessary. As a result, it is possible to realize a receiving circuit whose size is reduced, and which requires no external switching over terminal.

Further, in addition to the foregoing configuration, the receiving circuit of the present invention may be so adapted that: the variable output circuit includes a first pulse generating circuit generating a received pulse by comparing an electric signal converted from the signal optical pulse with a threshold, the received pulse being a digital signal; and either the received pulse generated by the first pulse generating circuit or a pulse having a different pulse width from that of the received pulse is selectively outputted as an output signal, in accordance with the pulse width of the signal optical pulse.

In the foregoing configuration, when the output signal is outputted, the pulse width of the output signal is switched over in accordance with the pulse width of the inputted signal optical pulse. This allows the switching over of an output signal based on the signal optical pulse in the receiving circuit. Further, it is not necessary to separately provide an external terminal for instructing switching over. Therefore, a space for the external terminal is no longer necessary. As a result, in addition to the foregoing effects, the realization of the receiving circuit is significantly simplified.

Further, in addition to the foregoing configuration, the receiving circuit of the present invention is so adapted that: the variable output circuit includes a second pulse generating circuit for generating a signal having a predetermined pulse width corresponding to a low-speed communication; and if it is judged that a pulse width of an output from the first pulse generating circuit exceeds a predetermined value, a signal generated by the second pulse generating circuit is outputted as the output signal, instead of outputting the received pulse.

In the foregoing configuration, the pulse width of the received pulse (i.e., a binary signal) corresponding to the signal optical pulse is specified. If the pulse width of the received pulse exceeds a predetermined value, a signal having a fixed pulse width is outputted as the output signal. Accordingly, if the pulse width deriving from the signal optical pulse is larger than a certain value, the communication is deemed as to be a low-speed communication, and a pulse having a constant pulse width corresponding to the communication speed is outputted. As a result, in addition to the foregoing effects, it is possible to switch over the communication speed to an appropriate speed for the low-speed communication, in accordance with the signal optical pulse in the receiving circuit.

Further, in addition to the foregoing configuration, the receiving circuit of the present invention is so adapted that: the variable output circuit includes (I) a trigger generating circuit for generating a trigger signal when a pulse generating time of the first pulse generating circuit exceeds a first predetermined period, and (II) a timer circuit for generating a pulse having a second predetermined pulse width, in response to the trigger signal from the trigger generating circuit; if the timer circuit outputs no pulse, a pulse outputted from the first pulse generating circuit is outputted as the output signal; and if the timer circuit outputs a pulse, a pulse outputted from the second pulse generating circuit is outputted as the output signal.

In the foregoing configuration, the first pulse generating circuit outputs an ultimate output signal, while the timer circuit is not outputting the output pulse. On the contrary, the second pulse generating circuit outputs the ultimate output pulse, while the timer circuit is outputting the output pulse. In other words, while the timer circuit is not outputting the output pulse, it is acknowledged that the communication speed is high, and output pulse having the pulse width for the high-speed communication is outputted. On the contrary, while the timer circuit is outputting the output pulse, it is acknowledged that the communication speed is low, and an output pulse having the pulse width for the low-speed communication is outputted. Accordingly, in addition to the foregoing effects, the foregoing configuration allows simple switching over of the communication speed according to the signal optical pulse.

Further, in addition to the foregoing configuration, the receiving circuit of the present invention is so adapted that the first pulse generating circuit includes a one-shot pulse generating circuit for maintaining the pulse width being outputted at a constant value, the one-shot pulse generating circuit to which the received pulse is inputted.

With the foregoing configuration, in the first pulse generating circuit, the pulse width of the output from the one-shot pulse generating circuit is kept constant. Accordingly, in addition to the foregoing effects, it becomes possible to prevent generation of a wrong pulse and distortion in the pulse width of the received output, during the high-speed communication.

Further, in addition to the foregoing configuration, the receiving circuit of the present invention is so adapted that the first pulse generating circuit includes a delay circuit to which the received pulse is inputted.

In the foregoing configuration, the output of the first pulse generating circuit delays by one pulse or the like. Accordingly, in addition to the foregoing effects, it is possible to prevent a width of a leading pulse of a set of signals from being stretched, at the time of acknowledging that the communication speed is low.

Further, in addition to the foregoing configuration, the receiving circuit of the present invention further includes a delay circuit connected to an output of the one-shot pulse generating circuit.

In the foregoing configuration, the output of the first pulse generating circuit delays by one pulse or the like. Accordingly, in addition to the foregoing effects, it is possible to prevent a leading pulse of a set of signals from being stretched, at the time of acknowledging that the communication speed is low.

Further, in addition to the foregoing configuration, the receiving circuit of the present invention is so adapted that a length of the first predetermined period is set between a pulse width of the output pulse from the second pulse generating circuit and a pulse width of the output pulse from the first pulse generating circuit.

In the foregoing configuration, the length of the first predetermined period is set between the pulse width of the output pulse from the second pulse generating circuit and the pulse width of the output pulse from the first pulse generating circuit. Therefore, the value of the first predetermined period (T1) is set between values of respective pulse widths of two communication speeds to be distinguished from each other. Accordingly, in addition to the foregoing effects, it also becomes possible to optimize the process of specifying the communication speed, in a case of adopting the common infrared data communication standard IrDA.

Further, in addition to the foregoing configuration, the receiving circuit of the present invention is so adapted that the first predetermined period is between 521 n sec. and 1.41 μsec.

In the foregoing configuration, the first predetermined period is between 521 n sec. and 1.41 μsec. Accordingly, in addition to the foregoing effects, it also becomes possible to distinguish the communication speed into (I) a communication speed of 576 kbps or higher, and (II) a communication speed of 115.2 kbps or lower. This allows outputting of an optimum received output pulse suitable for the communication speed.

Further, in addition to the foregoing configuration, the receiving circuit of the present invention is so adapted that the second predetermined period is equal to or longer than a maximum interval between a pulse and another pulse.

In the foregoing configuration, the second predetermined period is equal to or longer than the maximum interval of a pulse and another pulse. Accordingly, in addition to the foregoing effects, it also becomes possible to maintain a status for the specified communication speed without fail until the end of the communication without additional terminal or control for resetting the second predetermined period is necessary.

Further, in addition to the foregoing configuration, the receiving circuit of the present invention is so adapted that the second predetermined period is 1.04 m sec. or longer.

In the foregoing configuration, the second predetermined period is 1.04 m sec. or longer. Accordingly, in addition to the foregoing effects, it also becomes possible to maintain the status without fail by setting the timer, so that the second predetermined period is equal to or longer than the maximum interval of a pulse and another pulse.

Further, in addition to the foregoing configuration, the receiving circuit of the present invention further includes: an amplifying circuit for amplifying an electronic signal converted from the signal optical pulse, the variable output circuit switching over, in accordance with a communication speed, a frequency band of the amplifying circuit during the period when the pulse of the second predetermined period exists.

In the foregoing configuration, the variable output circuit switches over, in accordance with a communication speed, the frequency band of the amplifying circuit during the period when the pulse of the second predetermined period exists. Accordingly, in addition to the foregoing effects, it also becomes possible to optimize the receiving circuit according to the communication speed. Further, it is possible to realizes an optimum S/N ratio according to the specified communication speed.

Further, in addition to the foregoing configuration, the receiving circuit of the present invention is so adapted that, during the period when the pulse of the second predetermined period exists, the variable output circuit switches over a response speed of the variable output circuit, in accordance with a communication speed.

With the foregoing configuration, the variable output circuit switches over the response speed thereof in accordance with the communication speed, during the period when the pulse of the second predetermined period exists.

Accordingly, in addition to the foregoing effects, it also becomes possible to optimize the receiving circuit according to the communication speed. Further, it is possible to realizes an optimum S/N ratio according to the specified communication speed.

Further, an electronic device of the present invention having a receiving circuit is so adapted that the receiving circuit is any one of the foregoing receiving circuits.

In the foregoing configuration, one pulse width is selected from a plurality of pulse widths, in accordance with the pulse width of the signal optical pulse. Then, the output signal having the selected pulse width is outputted as the output signal. This allows outputting of an output signal based on the signal optical pulse in the receiving circuit. Further, it is not necessary to separately provide an external terminal for instructing switching over. Therefore, a space for the external terminal is no longer necessary. As a result, it is possible to (I) realize a receiving circuit whose size is reduced, and which requires no external switching over terminal, and (II) realize an electronic device whose size can be reduced.

Additional objects, features, and strengths of the present invention will be made clear by the description below. Further, the advantages of the present invention will be evident from the following explanation in reference to the drawings.

DESCRIPTION OF THE EMBODIMENTS

The present embodiment deals with an example of applying the present invention to a common infrared data communication standard called IrDA. However, the present invention is not limited to such an example. Further, light being used is not limited to an infrared ray. Note that the same symbols are given to the members that have the same functions as those illustrated in FIG. 9, and the descriptions of those members are omitted here.

Figure 1:
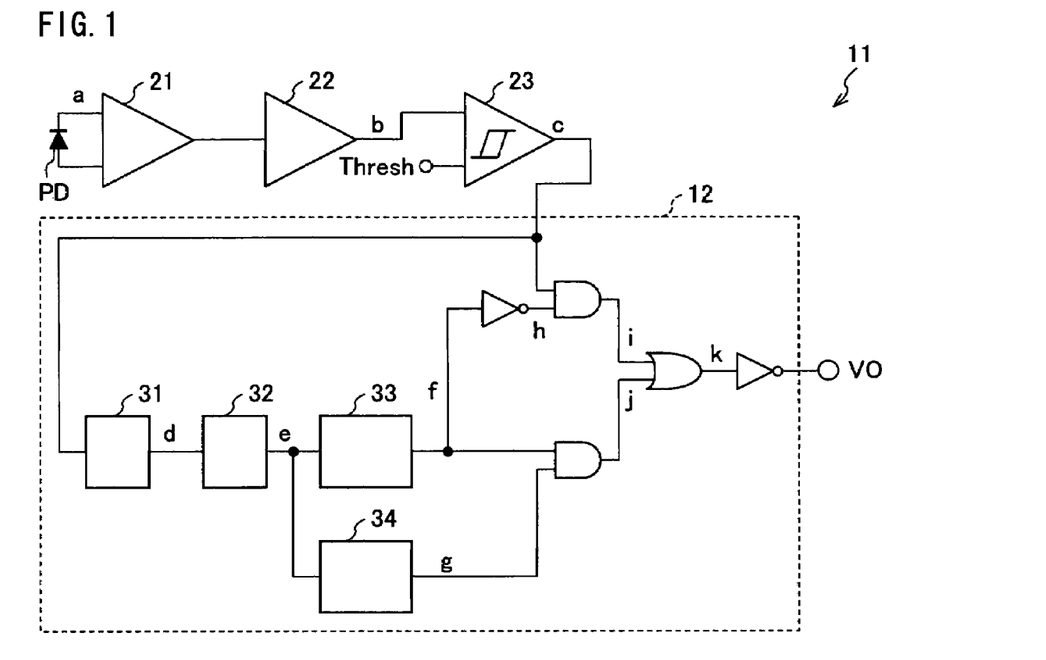
FIG. 1 is a block diagram illustrating a configuration of a receiving circuit of the present invention for use in an infrared data communication.

FIG. 1 is a block diagram of an infrared-ray-receiving equivalent circuit. A configuration of an entire receiving circuit 11 for use in an optical communication includes: (I) the comparator 23 described in "BACKGROUND ART" with reference to FIG. 9; and (II) a switching circuit 12 provided at an output end of the comparator 23, the switching circuit 12 as an automatic communication speed switching circuit block for automatically switching over a communication speed. Thus, a variable output circuit includes the amplifying circuits 21 and 22, the hysteresis comparator circuit 23, and the switching circuit 12.

The switching circuit 12 includes: (I) an integration circuit 31 for measuring a pulse width of a comparator output (c); (II) a one-shot-timer-input-use trigger generating circuit 32 for generating a trigger pulse when the pulse width of the comparator output (c) is longer than a first predetermined period T1, the trigger generating circuit 32 being connected to the integration circuit 31; (III) a one-shot pulse generating circuit 33 serving as a timer circuit, the one-shot pulse generating circuit 33 for generating a pulse of a second predetermined period T2; and (IV) a one-shot pulse generating circuit 34 (second pulse generating circuit) for generating a pulse of a third predetermined period T3. The one-shot timer generating circuit 33 and the one-shot timer generating circuit 34 are respectively connected to the trigger generating circuit 32. Further, a logic circuit having the following logic is connected to outputs of the one-shot timer generating circuit 33, the one-shot timer generating circuit 34, and the hysteresis comparator 23. A pulse is outputted, via the logic circuit, to a received output (VO) serving as an output of the receiving circuit.

The logic of the logic circuit is as follows. Namely, while the one-shot pulse generating circuit 33 is generating the pulse of the second predetermined period, the one-shot pulse generating circuit 34 outputs the pulse of the third predetermined period to the received output (VO). On the contrary, while the one-shot pulse generating circuit 33 is not generating the pulse of the second predetermined period, the output from the comparator output (c) is outputted, as it is, to the received output. Thus, in accordance with the pulse width of the signal optical pulse, the output signal outputted from the received output is switched over between a received pulse (digital pulse from the hysteresis comparator 23) and a pulse having a different pulse width from that of the received pulse.

More specifically, when the trigger pulse is generated at the node (e), it is acknowledged that the pulse width of the received pulse generated by the hysteresis comparator circuit 23 is longer than the predetermined width (T1), and that the pulse width of the signal optical pulse is therefore longer than the predetermined width (T1). As a result, it is judged that the communication is in a low-speed mode. In this case, the one-shot pulse generating circuit 33 generates the pulse of the second predetermined period. Then, based on the foregoing logic, the one-shot pulse generating circuit 34 whose output pulse has the pulse width of the third predetermined period outputs, to the received output VO, a pulse having a pulse width for the low-speed communication. As described, it is judged whether or not the pulse width of the received pulse being outputted from the hysteresis comparator circuit 23 serving as a first pulse generating circuit is longer than the predetermined value (T1). If the pulse width is longer than the predetermined value (T1), a signal having a constant pulse width for the low-speed communication is outputted as the output signal from the one-shot pulse generating circuit 34 serving as a second pulse generating circuit, instead of outputting the reception signal as the output signal.

Once it is judged that the communication is the low-speed communication, the low-speed communication is maintained for a period corresponding to the second predetermined pulse width of the one-shot pulse generating circuit 33, and transmission of the received pulse from the comparator output to the received output (VO) is blocked during this period.

Figure 6:
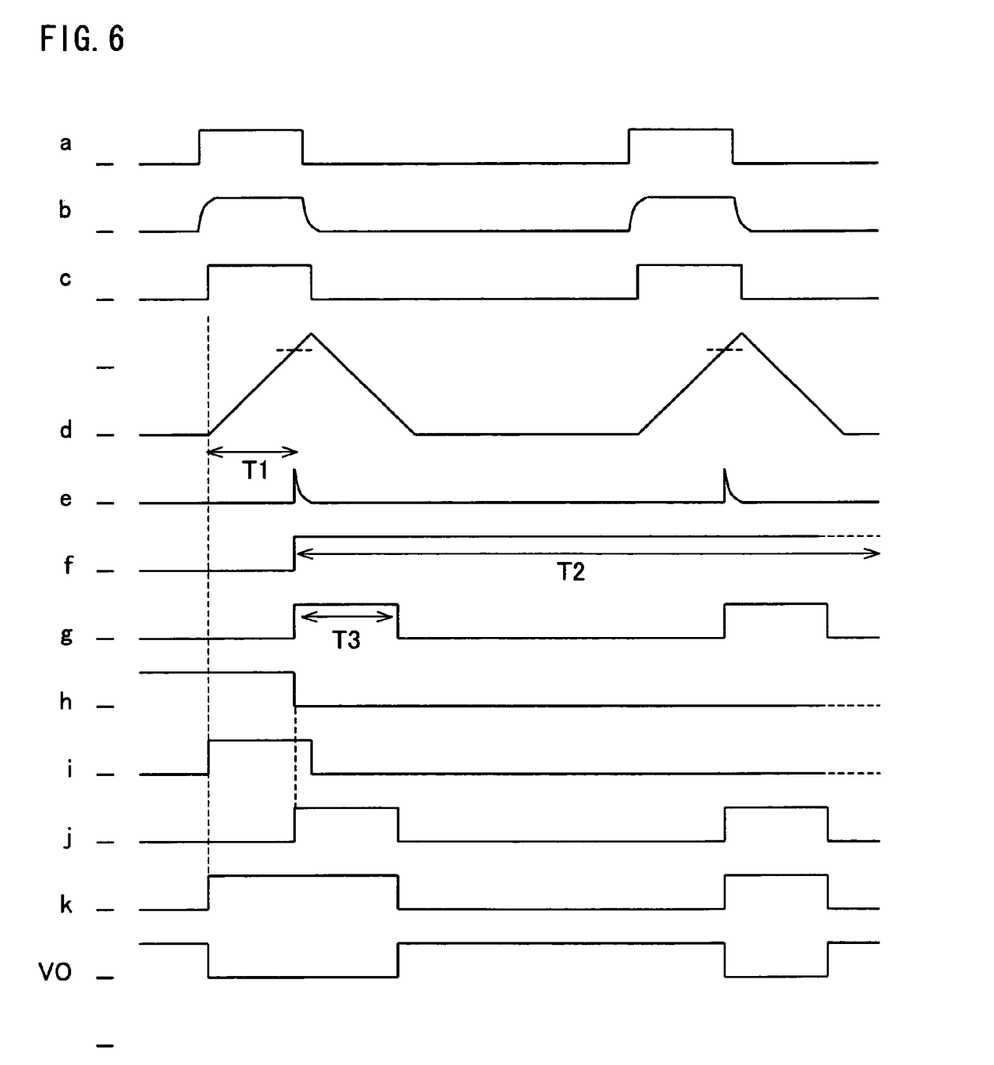
FIG. 6 is a diagram illustrating exemplary waveforms of nodes in the equivalent circuit block of the present invention in a low-speed mode.
Figure 8:
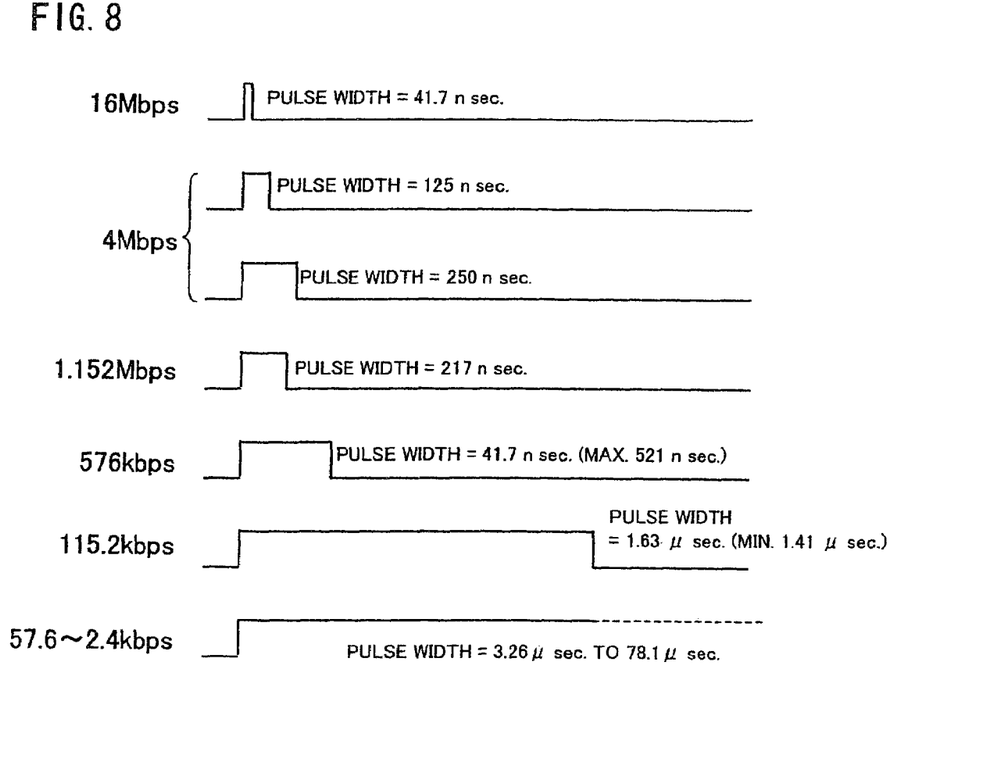
FIG. 8 is a diagram illustrating communication speeds and pulse widths defined under an infrared data communication standard.

FIG. 6 is a timing chart showing exemplary waveforms of respective nodes in the circuit block, during the low-speed mode. The first, second, and third predetermined periods (pulse widths) are respectively indicated by T1, T2, and T3 in FIG. 6. Note that the pulse width (T3) of a node (g); i.e., the pulse width of the output pulse from the one-shot pulse generating circuit 34, is longer than the pulse width of a node (c); i.e., the pulse width of the output pulse from the hysteresis comparator circuit 23. Further, the pulse width of the node (c), and the pulse width (T3) of the node (g) are respectively 434 n sec, 1.63 μsec., or the like as shown in FIG. 8.

In this example, the predetermined pulse width (T3) is outputted to the received output (VO) during the low-speed communication. This is a common technology for restraining a malfunction due to distortion in an amplified waveform caused by (I) internal noise of the receiving circuit and/or (II) an interference of a received input and the received output. A value of the T3 can be selected in accordance with the speed of the low-speed communication.

Next, if the trigger pulse is not generated at the node (e), it is acknowledged that the pulse width of the received input pulse is equal to or less than the predetermined pulse width (T1). Thus, it is judged that the communication is in the high-speed mode. In this case, the logic is such that the pulse width of the pulse from the comparator output is outputted, as it is, to the received output (VO).

Figure 5:
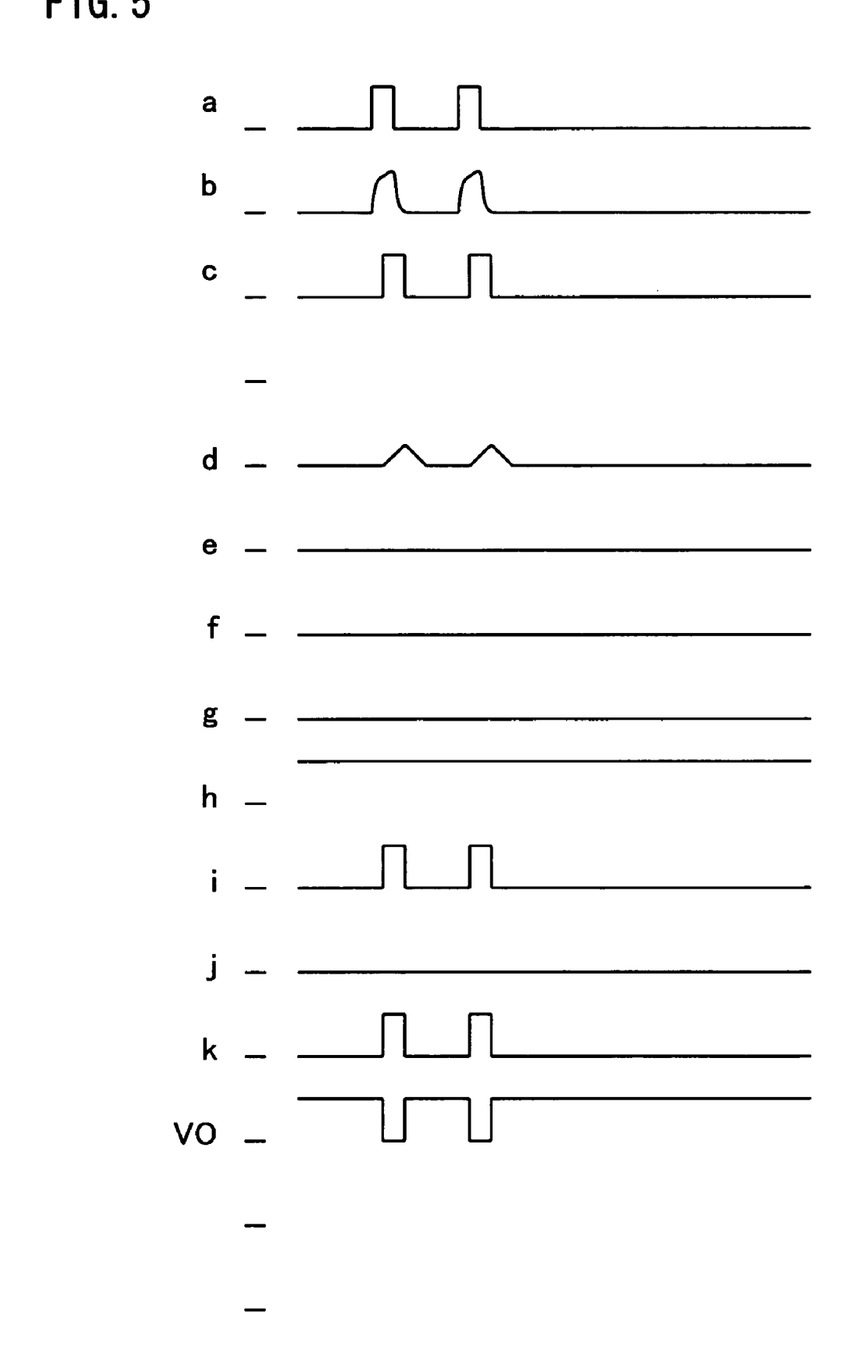
FIG. 5 is a diagram illustrating exemplary waveforms of nodes in an equivalent circuit block of the present invention in a high-speed mode.

FIG. 5 is a timing chart showing exemplary waveforms of the nodes in the circuit block, during the high-speed mode.

As described, in the present embodiment, the pulse width of the signal optical pulse is measured. Then, in accordance with the measured pulse width, the pulse width of the output signal is determined, and the output signal having the pulse width thus determined is outputted. For example, in accordance with the pulse width of the signal optical pulse, one pulse width is selected from a plurality of pulse widths including the pulse width corresponding to the pulse width of the signal optical pulse. Then, the output signal having the selected pulse width is outputted as the output signal. The pulse of this output signal may be arranged as follows. Namely, as is done in the hysteresis comparator 23, the pulse of the output signal may have a pulse width which is a reproduction of the pulse width of the signal optical pulse being inputted, and it is possible to generate such a pulse every time the signal optical pulse is inputted. Alternatively, it is also possible to use a circuit provided in advance, which generates a pulse having a fixed pulse width as is done in the switching circuit 12. Further, a person in charge of designing may decide how to select and determine the pulse width of the output signal. For example, as described in the present embodiment, the receiving circuit may be so arranged, in the manufacturing process therefor, that one of signals respectively having different pulse widths is selectively outputted according to whether or not the pulse width of the signal optical pulse is longer than the predetermined value (T1). More specifically, the receiving circuit may be so arranged as to: (I) output the output signal whose pulse width is the same as that of the signal optical pulse, if the pulse width of the signal optical pulse is equal to or less than the predetermined value (T1); or (II) output an output signal (e.g., the output signal having a long pulse width for the low-speed communication) whose pulse width is different from the pulse width of the signal optical pulse, if the pulse width of the signal optical pulse is longer than the predetermined value (T1). This makes it possible to output an appropriate output signal in accordance with the signal optical pulse in the receiving circuit. Thus, without a need of a switching-over terminal, it is possible to automatically specify the communication speed, and output the most appropriate received output pulse in accordance with the communication speed.

Further, by increasing the number of stages for judging the pulse width of the received input, the communication speed can be distinguished into three or more ranges. This allows generation of the received output pulse to be optimized for each of the ranges of the communication speed.

Figure 2:
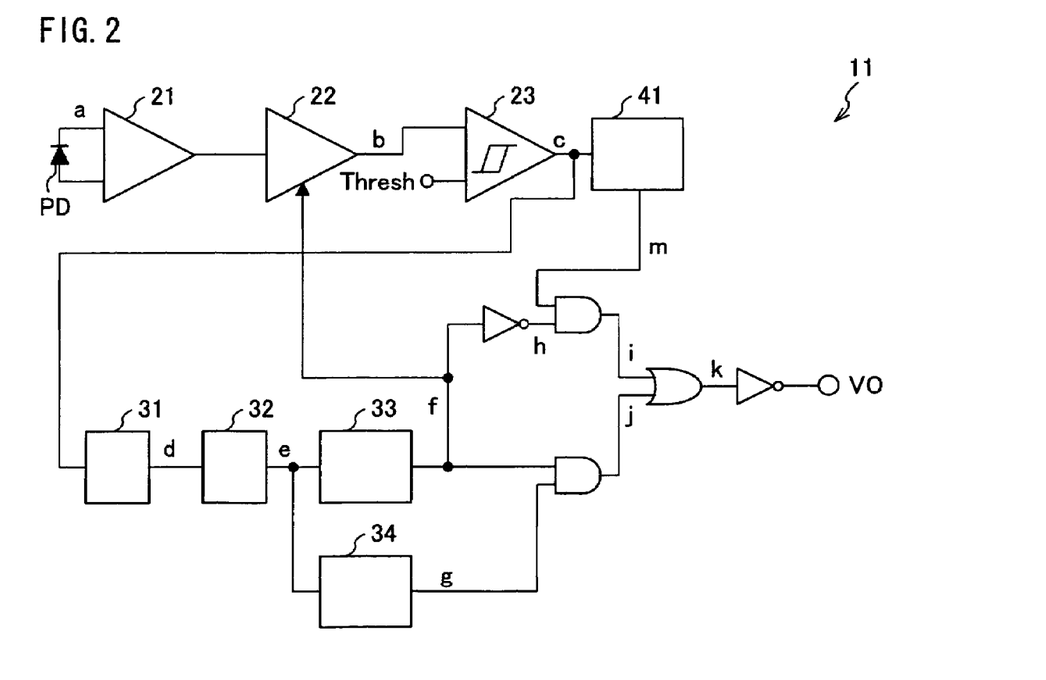
FIG. 2 is a block diagram illustrating another configuration of the receiving circuit of the present invention for use in an infrared data communication.

FIG. 2 is a block diagram illustrating another exemplary configuration of the equivalent circuit. A difference from the configuration shown in FIG. 1 is that a one-shot pulse generating circuit 41 is added to the output end of the comparator 23, so that the width of the output pulse during the high-speed communication is kept constant. Conventionally, distortion of a waveform has been significant in a high-speed communication. This distortion of the waveform causes distortion in the pulse width and generation of wrong pulses. In order to avoid these problems, the pulse width of a signal being outputted is fixed at a predetermined pulse width by using a one-shot pulse generating circuit or the like. However, a wide pulse width which is suitable in a low-speed communication cannot be outputted when a pulse width of an outputted one-shot pulse is fixed at a narrow pulse width for use in the high-speed communication. It is however possible to realize fixed pulse widths optimized for various communication speeds by (I) using the automatic switching-over system of the present invention, and (II) generating the one-shot pulse during the high-speed communication.

Figure 3:
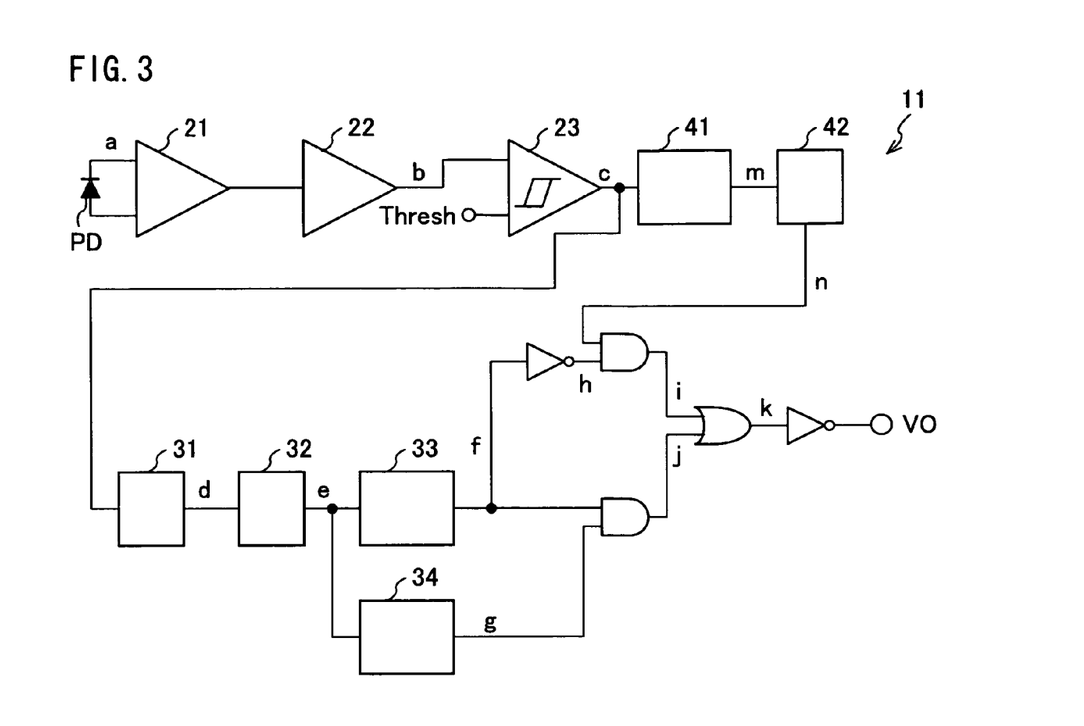
FIG. 3 is a block diagram illustrating still another configuration of the receiving circuit of the present invention for use in an infrared data communication.

FIG. 3 is a block diagram illustrating yet another exemplary configuration of the equivalent circuit. The configuration illustrated in FIG. 3 differs from that of FIG. 2 in that a delay circuit 42 is provided in a stage subsequent to the one-shot pulse generating circuit 41. This prevents a leading pulse of a signal row from being stretched during the low-speed communication. Note that the delay circuit 42 may be directly provided in a stage directly subsequent to the hysteresis comparator circuit 23, and the one-shot pulse generating circuit 41 may be omitted.

Figure 7:
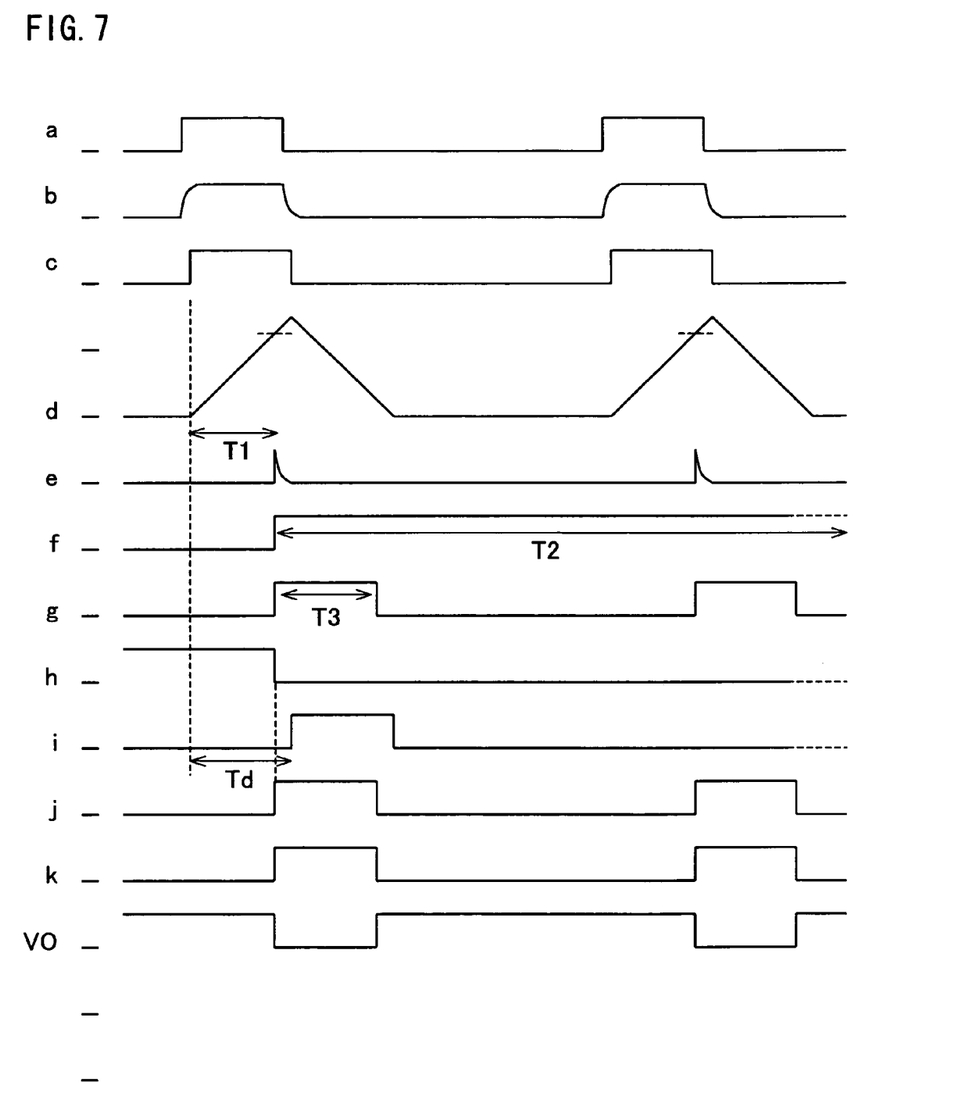
FIG. 7 is a diagram illustrating exemplary waveforms of nodes in the equivalent circuit block of the present invention in a low-speed mode, in a case where a received pulse is delayed.

More specifically, in the waveform chart of FIG. 6, a leading pulse of the VO waveform is wider than it supposed to be; i.e., wider than the pulse width of the second pulse and the successive pulses. This is attributed to such a setting that the pulse is outputted during the period (T1) taken to specify the communication speed, since start of inputting of the set of pulses. This inevitably causes the leading pulse to stretch until the period (T1) is elapsed. In view of the foregoing problem, the pulse of a node (i) in FIG. 6 is delayed as shown in FIG. 7, so that the leading pulse is kept from being stretched. A delay time Td is preferably longer than the first predetermined period (T1) for use in specifying the communication speed.

The value (length) of the first predetermined period (T1) shown in FIG. 6 may be between values of respective pulse widths of two communication speeds to be distinguished from each other. More specifically, the value of the T1 may be between (I) a value of the pulse width of the pulse outputted from the hysteresis comparator circuit 23 serving as the first pulse generating circuit, and (II) a value of the pulse width of the pulse outputted from the one-shot pulse generating circuit 34 serving as the second pulse generating circuit. Note that, as mentioned before, the pulse width (T3) of the pulse outputted from the one-shot pulse generating circuit 34 is longer than the pulse width of the pulse outputted from the hysteresis comparator circuit 23. The following describes IrDA standard which is the common infrared data communication standard, with reference to an example. FIG. 8 shows pulse widths of communication speeds used under IrDA standard. For example, it is preferable to: (I) distinguish the communication speeds into (i) a communication speed of 576 kbps or more, and (ii) a communication speed range of 115.2 kbps or less; and then (II) output the received output optimized for the distinguished communication speed. In this case, the period (T1) for judging the communication speed may be set between (I) 521 n sec. which is a maximum pulse width in a communication of 576 kbps, and (II) 1.41 μsec. which is a minimum pulse width in a communication of 115.2 kbps. The communication speed is more accurately distinguished by setting the T1 to a value nearby the mid point of these pulse widths; i.e., about 0.9 to 1.0 μsec.

The second predetermined period (T2) may be as follows. Namely, T2 is a period (maintaining period) during which the status is maintained after the communication speed is specified. It is necessary that the maintaining period last until the communication ends. However, it is not preferable that a resetting operation be required. This is because the requirement of the resetting operation necessitates a terminal and additional control for the resetting operation. In order to overcome this problem, the second predetermined period (T2) is set at a minimum amount of time required for maintaining the communication speed. On this account, the maintaining period is extended by using a re-triggerable one-shot circuit for resetting the timer circuit every time a pulse is received.

For example, in IrDA standard which is the common infrared data communication standard, the lowest communication speed in the low speed communication is 9.6 kbps, and the maximum interval between a pulse and another pulse is 1.04 m sec. Accordingly, the communication speed is maintained without fail by setting the second predetermined period at 1.04 m sec. or longer.

Figure 4:
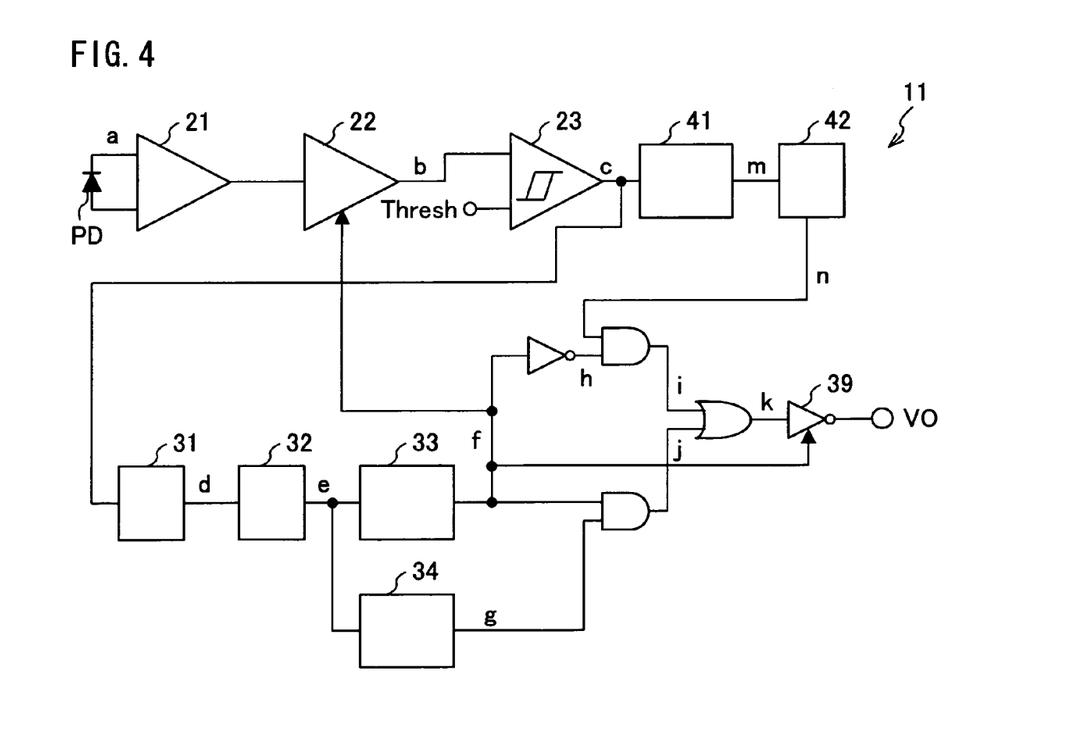
FIG. 4 is a block diagram illustrating yet another configuration of the receiving circuit of the present invention for use in an infrared data communication.

FIG. 4 shows still another configuration. In FIG. 4, a node (f) signal, which is a signal where the communication speed is specified, is used for: (I) switching over a frequency band and a gain of the amplifying circuit 22 for optimization so as to suit the communication speed; or (II) switching over a response speed of the first pulse generating circuit. In this case, the first pulse generating circuit is the variable output circuit. This first pulse generating circuit includes the hysteresis comparator circuit 23, and further includes, if necessary, the one-shot pulse generating circuit 41; a delay circuit 42; and the received output inverter circuit 39 provided at a leading end of a node (k). In the example of FIG. 4, control is performed with respect to the received output inverter circuit 39.

Figure 11:
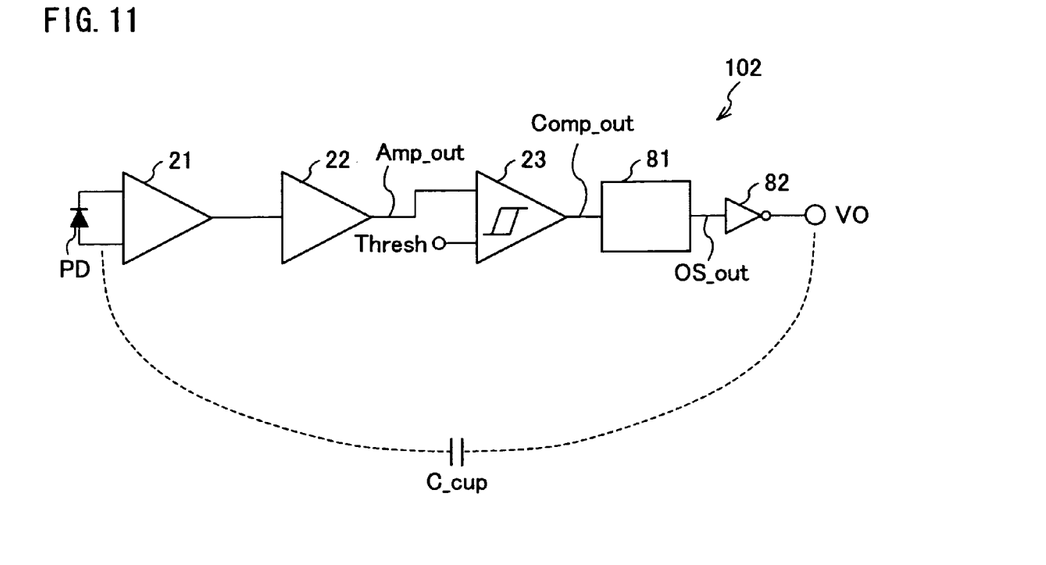
FIG. 11 is a diagram illustrating an example of noise generation caused by an interference of input and output signal waveforms in the receiving circuit for use in the infrared data communication.

The following provides more detailed description of the above, with reference to a configuration illustrated in FIG. 11. An optical communication-use receiving circuit 102 illustrated in FIG. 11 has a configuration similar to the configuration shown in FIG. 9, and further includes: a one-shot pulse generating circuit 81 connected to the output of the hysteresis comparator circuit 23; and a received output inverter circuit 82 connected to an output OS_out of the one-shot pulse generating circuit 81. It is advantageous to switch over the response speed of the pulse generating circuit, and a processing speed of the received output circuit has been speeded up along with the acceleration of the communication speed. However, under such circumstances, an influence by an interference of the received input and the received output has become no longer ignorable. The interference causes distortion in a waveform of an amplifier, and this distortion induces various malfunctions. More specifically, the equivalent circuit illustrated in the block diagram of FIG. 11 has, between (I) the received output VO and (II) the received input section (PD section) or the amplifying circuit, a capacitive coupling (coupling capacitance C_cup) via resin or the like used for packaging. This causes the waveform outputted from the amplifier to be distorted at a timing of voltage transition in the received output VO. The distorted waveform again generates an unnecessary pulse at the comparator output. Using this unnecessary pulse as a trigger, a one-shot pulse is generated, and this one-shot pulse generates an unnecessary pulse at the received output, thus causing a malfunction.

On the other hand, in a low-speed communication, the high-speed received output circuit is not required to respond at a high-speed. Therefore, in order to reduce the influence from the capacitive coupling, the response speed of the output circuit is reduced during the low-speed communication. By having the configuration of FIG. 4, the receiving circuit is optimized for the specified communication speed. This realizes appropriate performance of the optical communication-use receiving circuit, by acquiring an optimum S/N ratio according to the specified communication speed.

As described, the following effects are obtained from the present invention. Namely, in the optical communication-use receiving circuit, the communication speed is automatically specified. This allows, without adding an external terminal for transmitting a communication speed switching-over signal, realization of a status and a received pulse for the specified communication speed. Further, communicating performance can be improved by optimizing the receiving circuit for the specified communication speed.

An electronic device including the foregoing optical communication-use receiving circuit for receiving an optical signal is not limited. Examples of such an electronic device are personal computer, mobile phone, PDA (Personal Digital Assistant).

A receiving circuit of the present invention may be for use in an infrared data communication so adapted that (I) the receiving circuit has a circuit in which (a) a signal optical pulse incident to a light-receiving element is amplified by a light-receiving amplifier; and (b) a received output pulse is outputted as a digital signal generated by comparing the output from the light-receiving amplifier with a threshold value and that (II) a pulse width of the received output pulse is automatically switched over in accordance with a pulse width of the inputted signal.

With the foregoing configuration, a switching over terminal which has been conventionally required is no longer needed. Thus, it is possible to easily reduce a size of a device having the receiving circuit.

A receiving circuit of the present invention for use in an infrared data communication may be so adapted that (I) the receiving circuit has a circuit in which (a) a signal optical pulse incident to a light-receiving element is amplified by a light-receiving amplifier and (b) a received output pulse is outputted as a digital signal generated by comparing the output from the light-receiving amplifier with a threshold value; and that (II) the pulse width of the received signal is specified; and (III) if the pulse width of the received signal is longer than a predetermined pulse width, a circuit which outputs a pulse having a pulse width which corresponds to a low-speed communication is activated so as to output a pulse having a constant pulse width suitable for the communication speed.

With the foregoing configuration, the switching over terminal which has been conventionally required is no longer needed. Thus, it is possible to easily reduce a size of a device having the receiving circuit.

A receiving circuit may further include: (I) a pulse generating circuit in which (a) a signal optical pulse incident to a light-receiving element is amplified by a light-receiving amplifier and (b) a received output pulse is outputted as a digital signal generated by comparing the output from the light-receiving amplifier with a threshold value; (II) a trigger generating circuit for generating a trigger signal when a period for generating the pulse in the first pulse generating circuit is longer than a first predetermined period; (III) a timer circuit for generating a pulse of a second predetermined period in reception to the trigger signal generated by the trigger generating circuit; (IV) a one-shot pulse generating circuit for generating a pulse of a third predetermined period; and (V) a logic such that (i) if the timer circuit outputs no pulse, the received output pulse is outputted as an ultimate output, and (ii) if the timer circuit outputs a pulse, a pulse of the one-shot pulse generating circuit is outputted as the ultimate output.

In the foregoing configuration, the communication speed is measured by specifying the pulse width of the received pulse, in reference to the first predetermined period. If the pulse width is wider than the first predetermined period, it is acknowledged that the communication speed is low, and a pulse width for the low-speed communication is outputted. On the contrary, if the pulse width of the received pulse is shorter than the first predetermined period, it is acknowledged that the communication speed is high, and a pulse having a pulse width for the high-speed communication is outputted. With this configuration, it is possible to easily and automatically switching over the pulse width of the outputted pulse.

Further, the receiving circuit of the present invention having the foregoing configuration may be so adapted that (I) the receiving circuit have a circuit in which (a) the signal optical pulse incident to the light-receiving element is amplified by the light-receiving amplifier; and (b) the received output pulse is outputted as the digital signal generated by comparing the output from the light-receiving amplifier with the threshold value; and that (II) the ultimate output is outputted by adding a one-shot pulse generating circuit to the pulse generating circuit.

With the foregoing configuration, it is possible to prevent the pulse width of the received output to be distorted during the high-speed communication, and to prevent generation of a wrong pulse.

Further, the receiving circuit of the present invention having the foregoing configuration may be so adapted that (I) the receiving circuit have a circuit in which (a) the signal optical pulse incident to the light-receiving element is amplified by the light-receiving amplifier; and (b) the received output pulse is outputted as the digital signal generated by comparing the output from the light-receiving amplifier with the threshold value; and that (II) a one-pulse-delaying circuit is added for outputting the ultimate output or (III) a one-shot pulse generating circuit is added and the one-pulse-delaying circuit is further added to the output of the one-shot pulse generating circuit.

This configuration prevents a leading pulse of a signal row from being stretched at the time of acknowledging that the communication speed is low.

Further, the foregoing receiving circuit of the present invention may be so adapted that a value of the first predetermined period (T1) is between values of respective pulse widths of two communication speeds to be distinguished from each other.

With the foregoing configuration, it is possible to most appropriately specify the communication speed, in a case where a common infrared data communication standard IrDA is adopted. Specifically, it is possible to (I) distinguish the communication speed between (i) a communication speed of 576 kbps or more, and (ii) a communication speed of 115.2 kbps or less, and (II) output a received output pulse optimized for the communication speed.

Further, the foregoing receiving circuit of the present invention may be so adapted that the first predetermined period is between 521 n sec. and 1.41 μsec.

With the foregoing configuration, it is possible to most appropriately specify the communication speed, in the case where the common infrared data communication standard IrDA is adopted. Specifically, it is possible to (I) distinguish the communication speed between (i) a communication speed of 576 kbps or more, and (ii) a communication speed of 115.2 kbps or less, and (II) output a received output pulse optimized for the communication speed.

Further, the foregoing receiving circuit of the present invention may be so adapted that the second predetermined period is equal to or longer than a maximum interval between a pulse and another pulse.

With the foregoing configuration, it is possible to optimize a period for specifying the communication speed and maintaining a status for the specified communication speed, in the case where the common infrared data communication standard IrDA is adopted. More specifically, when a signal row is being inputted at a speed of 115.2 kbps or lower, it is possible to maintain the status without fail by setting the timer with which the second predetermined period is set so as to be equal to or longer than the maximum interval between a pulse and another pulse.

Further, the foregoing receiving circuit of the present invention may be so adapted that the second predetermined period is 1.04 m sec. or longer.

With the foregoing configuration, it is possible to optimize the period for specifying the communication speed and maintaining a status for the specified communication speed, in the case where the common infrared data communication standard IrDA is adopted. More specifically, when a signal row is being inputted at a speed of 115.2 kbps or lower, it is possible to maintain the status without fail by setting the timer with which the second predetermined period is set so as to be equal to or longer than the maximum interval between a pulse and another pulse.

Further, the foregoing receiving circuit of the present invention may be so adapted that a frequency band of the amplifying circuit or the communication speed of the output circuit is switched over during the period when the pulse of the second predetermined period exists, in accordance with the communication speed of the amplifying circuit.

With the foregoing configuration, the performance of the receiving circuit is optimized according to the specified communication speed. This realizes an optimum S/N ratio according to the specified communication speed.

Further an electronic device of the present invention may include any one of the infrared data communication-use receiving circuit.

The present invention is applicable to a communication carried out by using an infrared ray or the like.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A receiving circuit, for use in an optical communication, from which an output signal is outputted in accordance with a signal optical pulse incident to a light-receiving element, the receiving circuit comprising:
    a variable output circuit for detecting a pulse width of the signal optical pulse, selecting one pulse width from a plurality of pulse widths in accordance with the pulse width thus detected, and outputting an output signal having the one pulse width thus selected;
    the variable output circuit includes a first pulse generating circuit generating a received pulse by comparing an electric signal converted from the signal optical pulse with a threshold, the received pulse being a digital signal;
    wherein either the received pulse generated by the first pulse generating circuit or a pulse having a different pulse width from that of the received pulse is selectively outputted as an output signal, in accordance with the pulse width of the signal optical pulse;
    the variable output circuit includes a second pulse generating circuit for generating a signal having a predetermined pulse width corresponding to a low-speed communication; and
    if it is judged that a pulse width of an output from the first pulse generating circuit exceeds a predetermined value, a signal generated by the second pulse generating circuit is outputted as the output signal, instead of outputting the received pulse; and
    the variable output circuit includes (I) a trigger generating circuit for generating a trigger signal when a pulse generating time of the first pulse generating circuit exceeds a first predetermined period, and (II) a timer circuit for generating a pulse having a second predetermined period, in response to the trigger signal from the trigger generating circuit;
    if the timer circuit outputs no pulse, a pulse outputted from the first pulse generating circuit is outputted as the output signal; and
    if the timer circuit outputs a pulse, a pulse outputted from the second pulse generating circuit is outputted as the output signal.

2. The receiving circuit as set forth in claim 1, wherein:
    a length of the first predetermined period is set between a pulse width of the output pulse from the second pulse generating circuit and a pulse width of the output pulse from the first pulse generating circuit.

3. The receiving circuit as set forth in claim 2, wherein the first predetermined period is between 521 n sec. and 1.41 μ sec.

4. The receiving circuit as set forth in claim 1, wherein the second predetermined period is equal to or longer than a maximum interval between a pulse and another pulse.

5. The receiving circuit as set forth in claim 4, wherein the second predetermined period is 1.04 m sec. or longer.

6. The receiving circuit as set forth in claim 1, further comprising:
    an amplifying circuit for amplifying an electronic signal converted from the signal optical pulse,
    the variable output circuit switching over, in accordance with a communication speed, a frequency band of the amplifying circuit during the period when the pulse of the second predetermined period exists.

7. The receiving circuit as set forth in claim 1, wherein:
    during the period when the pulse of the second predetermined period exists, the variable output circuit switches over a response speed of the variable output circuit, in accordance with a communication speed.

8. A receiving circuit, for use in an optical communication, from which an output signal is outputted in accordance with a signal optical pulse incident to a light-receiving element, the receiving circuit comprising:
    a variable output circuit for detecting a pulse width of the signal optical pulse, selecting one pulse width from a plurality of pulse widths in accordance with the pulse width thus detected, and outputting an output signal having the one pulse width thus selected;
    the variable output circuit includes a first pulse generating circuit generating a received pulse by comparing an electric signal converted from the signal optical pulse with a threshold, the received pulse being a digital signal;
    wherein either the received pulse generated by the first pulse generating circuit or a pulse having a different pulse width from that of the received pulse is selectively outputted as an output signal, in accordance with the pulse width of the signal optical pulse;
    the variable output circuit includes a second pulse generating circuit for generating a signal having a predetermined pulse width corresponding to a low-speed communication; and
    if it is judged that a pulse width of an output from the first pulse generating circuit exceeds a predetermined value, a signal generated by the second pulse generating circuit is outputted as the output signal, instead of outputting the received pulse; and wherein the first pulse generating circuit includes a one-shot pulse generating circuit that receives the received pulse and maintains the pulse width of the output signal at a constant value.

9. The receiving circuit as set forth in claim 8, further comprising a delay circuit connected to an output of the one-shot pulse generating circuit.

10. A receiving circuit, for use in an optical communication, from which an output signal is outputted in accordance with a signal optical pulse incident to a light-receiving element, the receiving circuit comprising:

a variable output circuit for detecting a pulse width of the signal optical pulse, selecting one pulse width from a plurality of pulse widths in accordance with the pulse width thus detected, and outputting an output signal having the one pulse width thus selected;

the variable output circuit includes a first pulse generating circuit generating a received pulse by comparing an electric signal converted from the signal optical pulse with a threshold, the received pulse being a digital signal;

wherein either the received pulse generated by the first pulse generating circuit or a pulse having a different pulse width from that of the received pulse is selectively outputted as an output signal, in accordance with the pulse width of the signal optical pulse;

the variable output circuit includes a second pulse generating circuit for generating a signal having a predetermined pulse width corresponding to a low-speed communication; and if it is judged that a pulse width of an output from the first pulse generating circuit exceeds a predetermined value, a signal generated by the second pulse generating circuit is outputted as the output signal, instead of outputting the received pulse; and wherein the first pulse generating circuit includes a delay circuit to which the received pulse is inputted.

11. A receiving circuit, for use in an optical communication, from which an output signal is outputted in accordance with a signal optical pulse incident to a light-receiving element, the receiving circuit comprising:

a variable output circuit for detecting a pulse width of the signal optical pulse, determining a pulse width of the output signal in accordance with the pulse width of the signal optical pulse, and outputting the output signal;

wherein the variable output circuit includes a first pulse generating circuit generating a received pulse by comparing an electric signal converted from the signal optical pulse with a threshold, the received pulse being a digital signal; and wherein either the received pulse generated by the first pulse generating circuit or a pulse having a different pulse width from that of the received pulse is selectively outputted as an output signal, in accordance with the pulse width of the signal optical pulse;

wherein the variable output circuit further includes a second pulse generating circuit for generating a signal having a predetermined pulse width corresponding to a low-speed communication; and if it is judged that a pulse width of an output from the first pulse generating circuit exceeds a predetermined value, a signal generated by the second pulse generating circuit is outputted as the output signal, instead of outputting the received pulse; and wherein the variable output circuit still further includes a trigger generating circuit for generating a trigger signal when a pulse generating time of the first pulse generating circuit exceeds a first predetermined period, and a timer circuit for generating a pulse having a second predetermined period, in response to the trigger signal from the trigger generating circuit;

if the timer circuit outputs no pulse, a pulse outputted from the first pulse generating circuit is outputted as the output signal; and if the timer circuit outputs a pulse, a pulse outputted from the second pulse generating circuit is outputted as the output signal.

\* \* \* \* \*